United States Patent [19]
Hill

[11] 3,798,087
[45] Mar. 19, 1974

[54] FAST BURNING COMPOSITE PROPELLANT

[75] Inventor: William E. Hill, Huntsville, Ala.

[73] Assignee: The United States of America as represented by the Secretary of the Army, Washington, D.C.

[22] Filed: Apr. 16, 1969

[21] Appl. No.: 817,615

[52] U.S. Cl.......... 149/19, 149/20, 149/22, 149/42, 149/44, 149/76
[51] Int. Cl............................................. C06b 11/00
[58] Field of Search............ 149/42, 19, 44, 20, 76, 149/22

[56] References Cited
UNITED STATES PATENTS
3,406,203   10/1968   Morrow et al...................... 260/583

Primary Examiner—Stephen J. Lechert, Jr.
Attorney, Agent, or Firm—Edward J. Kelly; Herbert Berl; Jack W. Voigt

[57] ABSTRACT

1-isopropenylcarborane is reacted with tetrafluorohydrazine to form NFIPC. NFIPC is a modifier to enhance the burning rates of composite propellants. When NFIPC is used to replace n- butylferrocene in a propellant formulation, a faster burning propellant with better physical properties results.

2 Claims, No Drawings

FAST BURNING COMPOSITE PROPELLANT

BACKGROUND OF THE INVENTION

Prior art experimentation with reactions of vinyl groups adjacent to a carborane nucleus has indicated that the alkenyl group can be hydrogenated and also that oxidation can be achieved though the product was not identified. The prior art has shown that reactions under electrophilic conditions with respect to 1-isopropenylcarborane have been unsuccessful. Generally, the results indicate that the carborane compound is confirmed to show an unreactive nature toward ionic additions.

A new composition of matter, as herein disclosed and specified, has been made by a process envolving the reaction of a vinyl group adjacent to a carborane nucleus.

The present invention has as its principal object to modify 1-isopropenylcarborane whereby two difluoramino radicals are added to the alkenyl group adjacent to the carborane nucleus of 1-isopropenylcarborane.

Another object is to provide an $NF_2$ adduct of 1-isopropenylcarborane which is useful as a catalyst in solid composite propellant compositions.

A particular object is to provide a catalyst which has also utility as a plasticizer for the propellant formulation and utility as an oxidant for metals when used in solid composite propellant compositions.

SUMMARY OF THE INVENTION

Tetrafluorohydrazine is reacted with 1-isopropenylcarborane to accomplish radical addition of the $NF_2$ groups to alkenyl group of 1-isopropenylcarborane. The utility of the $NF_2$ adduct of the carborane compound is illustrated by testing in a solid composite propellant composition.

Description of the Preferred Embodiment: The compound, a bis-difluoramino derivative of 1-isopropenylcarborane, with structure as shown by illustration below, is used as a replacement for n-butylferrocene in a composite propellant formulation to enhance the burning rate and to improve the physical properties of the composite propellant composition wherein contained.

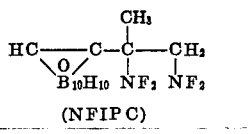

(NFIPC)

NFIPC serves as a catalyst, plasticizer in the propellant formulation and an oxidant for the metal contained in the novel composite propellant formulation to follow.

The novel propellant formulation is constituted of ingredients substantially as follows:

| Component | Wt.% |
|---|---|
| Binder (Hydroxyterminated polybutadiene) | 11.0 |
| NFIPC | 11.0 |
| Ammonium perchlorate ($12\mu$) | 63.0 |
| Aluminum (powder) | 15.0 |
| Total | 100.0% |

The novel propellant formulation illustrated above showed a burning rate of 1.17 in./sec. at 1,000 psi. This compares with 1.00 in./sec. for propellant using n-butyl ferrocene in the same concentration and in a propellant composition having the same amount of binder, ammonium perchlorate, and aluminum powder.

Propellant formulations of the type required for use with the catalyst of this invention generally contain by weight, binder from about 10 to 25 percent, inorganic oxidizing salt from about 10 to about 70 percent by weight, powdered metals from about 5 to about 20 percent by weight, and NFIPC from about 5 to about 20 percent by weight. The ingredients selected should total 100 percent with the exception that minor amounts of stabilizers and processing aids (e.g., metallic oxides such as magnesium oxide and lecithin) may be used as additives.

The inorganic oxidizing salts which are useful in the solid propellant composition of this invention are those oxygen containing salts which readily give up oxygen. These oxidants include ammonium, alkali metal, and alkaline earth metal salts of nitric, perchloric, and chloric acids, and mixtures thereof. Representative of the oxidants are ammonium perchlorate, ammonium nitrate, sodium nitrate, potassium perchlorate, potassium chlorate, lithium perchlorate, lithium chlorate, calcium nitrate, calcium chlorate, barium perchlorate, strontium chlorate, and strontium perchlorate. Ammonium perchlorate is preferred since less smoke results from lower solids present in exhaust gases from a rocket wherein used. Lower visible smoke is required for military purposes of concealment. Ammonium perchlorate of fine particle size in range of about $12\mu$ is very suitable for use in the propellant composition of this invention.

Powdered metals useful in the propellant compositions of this invention include in addition to aluminum, magnesium, titanium, zirconium, and boron. Alloys and mixtures of the aforesaid metals may also be employed.

Binders for propellants useful in this invention may be comprised of acrylates, acrylic acid and polybutadiene polymers or polyurethanes. A preferred binder is hydroxyterminated polybutadiene. The binder contributes the physical properties necessary to hold the propellant together during the burning, and in addition, the binder contributes to the combustion process.

The catalyst, NFIPC, contributes plasticizer properties to the propellant formulation in addition to the catalytic and oxidizing values. The fluorine of NFIPC is available to react with the metal ingredient to provide added impulse to the propulsion system in which the propellant of this invention is used. NFIPC can be used as a replacement for n-butylferrocene and other catalyst to improve burning rates; however, the use of NFIPC in addition to other catalysts in the same formulation provides a wider range of burning rates. The migration problem sometimes associated with n-butylferrocene in propellant formulations is not encountered with NFIPC because of its desirable structure and properties which causes it to homogenize with the other propellant ingredients.

The procedure for propellant mixing as conventionally used in the propellant manufacturing art is employed in making the propellant grains of this invention. For example, the propellant formulation ingredients are blended together under vacuum until homogeneous mixture is obtained and then the propellant grain is formed and cured. The metal powder is usually mixed with the binder and the mass mixed until the metal powder is wetted. The inorganic oxidizing salt and any stabilizers are next added and the mixture is mixed under vacuum until a homogeneous mixture is obtained. Then the NFIPC is added and the mixing is continued for about 0.5 hour. The resulting mixture is cast into a suitable mold or rocket motor to form the propellant grain and to cure. The grain is cured for several days at about 80°C until a cured grain is obtained. The curing may vary somewhat, but generally in about five days the grain is properly cured.

As noted earlier, the use of stabilizers, wetting agents, curing agents, antioxidants, etc. to improve storability, castability, and curing time is contemplated as being required for some systems and these materials may be added without departing from the scope of the invention.

EXAMPLE

The NFIPC, which is 1,2-Bis(difluoramino)-2-(1-carboranyl)propane, is prepared by procedure as follows: 1-Isopropenylcarborane (0.011 mole) is washed into a 500-ml stainless steel Hoke bomb with 100 ml of carbon tetrachloride (Spectro grade). The bomb is cooled to −80°, evacuated, and charged with tetrafluorohydrazine (0.044 mole). The bomb is heated to 150° for 24 hr. Excess tetrafluorohydrazine and carbon tetrachloride are removed under vacuum and the remaining oil is washed into a round-bottom flask with fresh oil and distilled to give 1,2-bis(difluoramino)-2-(1-carboranyl)propane, bp 95° ($\approx$3 mm), as a colorless liquid in 67 percent yield.

The proton nmr spectrum of the methyl group appears to be a triplet (average $J_{H-F}$ = 2 cps) of triplets (average $J_{H-f}$ = 1 cps) centered at 1.69 ppm. An absorption at 4.03 ppm due to the C—H on the carboranyl cage is also observed. The absorptions due to the methylene protons have the gross appearance of a triplet ($J_{H-F}$ = 27 cps) centered at 4.10 ppm but the pattern is complicated by further coupling. The fluorine nmr spectrum shows two absorptions, a triplet ($J_{H-F}$ = 27 cps) centered at $\phi$ −65.7 and a broad singlet at $\phi$ −36.7. The infrared spectrum confirms the absence of the double bond and contains bands characteristic of vicinal difluoramino groups. Anal. Calcd for $B_{10}C_5H_{16}N_2F_4$: C, 20.83; H, 5.55; N, 9.72; F, 26.38; Found: C, 21.82; H, 5.73; N, 9.85; F, 26.70.

I claim:

1. A solid propellant composition which comprises from about 10 to 70 percent by weight of the total propellant composition of an inorganic oxidizing salt, about 5 to about 20 percent by weight of the total propellant composition of a powdered metal selected from the group consisting of aluminum, magnesium, titanium, zirconium, boron, alloys thereof and mixtures thereof, about 10 to 25 percent by weight of the total propellant composition of a binder selected from the group consisting of polymers of acrylates, acrylic acid and polybutadiene polymers, hydroxyterminated polybutadiene polymers, and polyurethanes, and 1,2-bis-(difluoramino)-2-(1-carboranyl)propane from about 5 to about 20 percent by weight of the total propellant composition.

2. The propellant composition of claim 1 wherein the organic oxidizing salt is ammonium perchlorate in an amount of about 63 percent by weight of the total propellant composition; wherein the binder is hydroxyterminated polybutadiene in an amount of about 11 percent by weight of the total propellant composition, wherein the powdered metal is aluminum powder in an amount of about 15 percent by weight of the total propellant composition; and wherein 1,2-bis-(difluoramino-2-(1-carboranyl) propane in an amount of about 11 percent by weight of the total propellant composition constitute essentially the ingredients of said propellant composition.

* * * * *